Patented Nov. 22, 1949

2,489,138

UNITED STATES PATENT OFFICE 2,489,138

PRODUCTION OF SILOXANES

James Franklin Hyde and William Herbert Daudt, Corning, N. Y., assignors to Corning Glass Works, Corning, N. Y., a corporation of New York No Drawing. Application February 21, 1946, Serial No. 649,385

6 Claims. (Cl. 260—448.2)

The present invention relates to new methods for the preparation of organosiloxanes which contain both diorgano-substituted silicon atoms and triorgano-substituted silicon atoms.

This application is a continuation-in-part of our co-pending application Serial No. 481,153, filed March 30, 1943, and assigned to the assignee of the present invention, which has now become abandoned.

The organosilicon materials to which this invention relates are those in which the organo radicals involved are attached to the silicon atoms by carbon to silicon bonds.

Siloxanes of the type indicated are desirable stable products. The general molecular character of these copolymers is a chain of alternating oxygen and silicon atoms containing at least three silicon atoms in which chain the terminal silicon atoms carry three organo radicals each and the intermediate silicon atoms carry two organo radicals each. Molecules of this type are not subject to further condensation except through the loss of organo radicals from the silicon. For this reason siloxanes of this character are very stable. The physical properties of these materials, such as viscosity and boiling point, are dependent upon the organo radicals which are bonded to the silicon, and upon the number of silicon atoms per molecule.

An object of the present invention is to provide improved methods for the preparation of siloxanes of the character indicated.

In accordance with the present invention a diorganosiloxane, i. e., a siloxane containing two organo radicals linked to each silicon by carbon to silicon bond, is reacted with a hexaorganodisiloxane in the presence of an alkali metal hydroxide. In order to obtain copolymers by this interaction, rearrangement of the silicon oxygen bond is necessary, since the hexaorganodisiloxane is completely condensed, and is, therefore, not subject to further condensation either with itself or with any other siloxane.

The process hereof is general in application and may be applied in connection with a wide variety of siloxanes. Both the diorganosiloxane and the hexaorganodisiloxane may carry a wide range of organo radicals. The present invention is applicable in instances where the organo radicals are alkyl radicals containing between 1 and 18 carbon atoms per alkyl; aryl radicals such as phenyl, totyl, and xenyl; aralkyl radicals such as benzyl; alicylic radicals such as cyclohexyl and methylcyclopentyl; an dalkenyl radicals such as allyl an methallyl. The reactants employed in the present process may contain various organo radicals, as in the end blocking of dimethyl substituted siloxanes with dimethylphenylsiloxy groups. This wide latitude in the application of this process is due to the organo radicals being non-reactive portions of the molecules in this process, the reaction involving the silicon-oxygen bonds only.

The hexaorganodisiloxanes here involved are those materials also known as organosilicon ethers and as triorganosilicyl oxides. The diorgano substituted siloxanes employed have a degree of substitution between 2 and 2.1 and may either be linear diorganosiloxanes or cyclic diorganosiloxanes. In the case of the linear diorganosiloxanes, triorganosilicon groups may be present at some terminal positions.

The average degree of substitution of the reaction mixture will to a substantial extent be controlling, with any particular type of organic substituents, of the physical state of the product. The present process is effective at an average degree of substitution between 2 and 2.5 organo radicals per silicon atom. The lower the degree of substitution, the higher will be the molecular aggregation of the products obtained. Light oils are obtained at the higher degrees of substitution when the organo substituents are primarily lower alkyls. When the average degree of substitution of the reaction mixture exceeds 2.5, relatively light oils are obtained, together with the disiloxane which is in excess of that sufficient to give the light oil obtained. In such an instance, it is generally desirable to separate the excess disiloxane following interaction of the materials.

The alkali metal hydroxide which is employed is preferably sodium or potassium hydroxide, due to the commercial availability of these materials. Other adequately strong alkalis, such as the quaternary ammonium hydroxides, may be employed. The function of the alkali in the present process is to cause the silicon to oxygen bonds to function ionically. It has been found that the alkali metal hydroxides effectuate this action over a wide range of proportions. Thus, the silicon-oxygen bonds have been found to function ionically in the presence of as small amounts of alkali as 7000 atoms of silicon per atom of alkali metal, and also when the alkali metal hydroxide is present in amount in excess of the atomic equivalent of silicon present. Whereas the ionic action of these bonds is obtained over a wide range, in order to cause the interaction with which this invention deals, the alkali should be present in amount less than equivalent to the diorgano-substituted silicon present. It is preferred when the degree of substitution is between 2 and 2.5 that the alkali to total silicon ratio be less than the degree of substitution minus 2. In the range between this value and an amount of alkali equivalent to the diorgano substituted silicon separation of some organosilicon salt from the intercondensate frequently occurs. When the degree of substitution exceeds 2.5, the alkali should be less than equivalent to the diorgano-silicon material present.

Water is generally present in the system during the interaction. Thus, when a siloxane reacts with an alkali metal hydroxide to form a silanol and an organosilicon salt, water may be produced by condensation of the silanol. Also, the diorgano-substituted siloxane may carry hydroxyl groups, which may be eliminated from the interacting molecules during the process. It is further possible to add the alkali metal hydroxide as aqueous solution, which introduces more water into the system. In order to effect rapid interaction, it is preferred that extraneous water (that not derived from hydroxyl groups in the diorganosiloxane and in the alkali metal hydroxide) introduced into the system be in amount not greater than 1.5 times the amount of alkali metal hydroxide, by weight. When the alkali metal hydroxide is added as aqueous solution, it is preferred that the concentration be at least 40 per cent by weight, or if less, that water be removed from the system during the course of interaction to this extent.

In order to accelerate initiation of the interaction, it is frequently desirable to add a polar or non-polar solvent such as, alcohol, dioxan, or benzene. While the initial accelerating effect of the solvent is obtained with a small amount of solvent, the desired interaction is obtained in the presence likewise of relatively large amounts.

The interaction hereof may be effected over a wide range of temperature from below room temperature to elevated temperature. The main difference effected by change of temperature is variation in the rate of reaction. When temperatures sufficiently elevated to cause cleavage of organo radicals are employed, the average degree of substitution is decreased, whereby the molecular complexity of the molecules produced is increased, with accompanying changes in the physical properties of the products. By such means it is possible to obtain gels and resins from a reaction mixture which has a degree of substitution above 2, and which would normally yield an oil.

Following interaction in accordance with the process hereof, it is desirable to eliminate the alkali either by neutralization, by washing with water, or by distillation in the case of low boiling oils. Removal of the alkali is desirable in order to stabilize the products and thereby prevent further rearrangement, due to shifting equilibria, depending upon the conditions to which the products is subjected.

For a better understanding of this invention, reference may be had to the following examples which should be considered only as illustrative of the method hereof.

Example 1

To 1 volume of a mixture containing 1 part by weight of hexamethyldisiloxane and 5 parts by weight of dimethylsiloxane there were added 3 volumes of 95% ethyl alcohol containing two thirds part by weight of potassium hydroxide. The mixture was refluxed at atmospheric pressure for 10 minutes, poured into water, acidified, and collected from the aqueous mixture with ether. The ether solution was washed with water. The ether solution was freed from volatile materials, including any residual unreacted hexamethyldisiloxane together with the solvent and water by heating at 100–140° at 18 mm. pressure while passing a stream of hydrogen through the mixture. The initial dimethylsiloxane was a fluid having a viscosity of 475 cs. at 25° C. The product had a viscosity of 82 cs. at 25° C., and increased to only 90 cs. after being heated 15 hours at 130–135° C. By analysis the product contained 80.2 per cent $SiO_2$ (calculated $SiO_2$ for

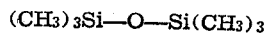

$(CH_3)_2SiO$; and the reaction mixture as prepared are respectively 74%; 81.02%; and 79.8).

Example 2

To 1 volume of a mixture containing 1 part by weight of symmetrical tetramethyldiphenyldisiloxane and 3 parts of dimethylsiloxane there were added 3 volumes of 95% ethyl alcohol containing two-thirds part of potassium hydroxide. This mixture was refluxed at atmospheric pressure for 5 minutes. The reaction product was recovered as in Example 1. The dimethylsiloxane fluid employed was the same as in Example 1. The product had a viscosity of 36 cs. at 25° C. which increased to only 39 cs. after heating 15 hours at 130–135° C.

Example 3

19 parts by weight of hexamethyldisiloxane was added to a mixture of 432 parts of a highly condensed dimethylsiloxane fluid having a viscosity of 15,000 cs. and 5.1 parts of sodium hydroxide. The mixture was held at 150–160° C. for 21 hours. The mixture was then carbonated to precipitate the alkali as sodium carbonate. The reaction product was found to be substantially free of low boiling distillate, indicating that the hexamethyldisiloxane had been consumed. The product had a viscosity of 245 cs.

Example 4

A mixture of 105.1 parts by weight of octamethylcyclotetrasiloxane, 38.3 parts of hexamethyldisiloxane and 2.10 parts of KOH (assay 87%). The mixture was refluxed for 16.5 hours, during which time the pot temperature increased from 127° to 180° C. due to interaction of the disiloxane to form higher boiling materials. The reaction product was filtered to remove solids, neutralized, washed with water, and dried over sodium sulfate. The dried liquid had a viscosity of 4.7 cs. as compared with 2.3 and 0.65 for the reactants, respectively. A portion thereof was heated for one hour at 140° to 150° C. to remove traces of water and any residual hexamethyldisiloxane. The total weight loss was only 4.8% which indicated that the disiloxane had interacted. The viscosity of the reaction product, thus freed of light ends, was 5.1 cs. Upon analysis this product was found to contain 37.41% silicon. The remainder of the dried liquid was fractionally distilled whereby a series of low viscosity fluids was obtained, which fluids had the properties noted:

| Fraction | Boiling Range | Viscosity in cs. |
|---|---|---|
| 1 | 100-180 at 746.7 mm | 1.1 |
| 2 | 177-181 at 746.7 mm | 1.7 |
| 3 | 90-127 at 5 mm | 2.1 |
| 4 | 122-183 at 3 mm | 3.6 |
| 5 | 183-200 at 3 mm | 4.8 |
| 6 | 153-205 at 0.5 mm | 7.7 |
| 7 | Still pot residue | 17.2 |

The major fractions were Nos. 1, 3, 4, 6, and 7. Fractions 6 and 7 amounted to 43% of the reaction product, and are highly stable oils of low vapor pressure. The various fractions contain compounds of the following type:

in which "$n$" is a positive integer. The boiling point of compounds of this type is dependent upon the specific value of "$n$."

When it is desired to produce materials such as fractions 6, and 7, the other materials may be retreated with alkali or added to a fresh charge of reactants. Likewise the lower boiling end blocked fluids may be produced by interacting the higher boiling fluids with hexaorganodisiloxane, either alone or in mixture with a fresh charge of reactants.

We claim:

1. The method of preparing siloxanes which comprises interacting hexamethyldisiloxane and a cyclic dimethylsiloxane in intimate contact with an alkali metal hydroxide.

2. The method of preparing siloxanes, which comprises interacting a hexaorganodisiloxane and a diorgano siloxane, the organic radicals of said siloxanes being selected from the group consisting of alkyl and monocyclicaryl radicals, in intimate contact with an alkali metal hydroxide.

3. The method of preparing siloxanes, which comprises interacting a hexaorganodisiloxane and a diorgano siloxane, the organic radicals of said siloxanes being selected from the group consisting of alkyl and monocyclicaryl radicals, in intimate contact with an alkali metal hydroxide, the alkali metal hydroxide being present in amount less than 1 atom of alkali metal per diorgano substituted silicon atom.

4. The method of preparing siloxanes, which comprises interacting a hexaorganodisiloxane and a diorgano siloxane, the organic radicals of said siloxanes being selected from the group consisting of alkyl and monocyclicaryl radicals, in intimate contact with an alkali metal hydroxide, in which reaction mixture the degree of substitution is between 2 and 2.5, the atomic ratio of alkali metal to silicon being less than the degree of substitution minus 2.

5. The method of preparing siloxanes, which comprises interacting a hexaorganodisiloxane and a diorgano siloxane, the organic radicals of said siloxanes being selected from the group consisting of alkyl and monocyclicaryl radicals in intimate contact with an alkali metal hydroxide, the atomic ratio of the alkali metal to silicon being less than the degree of substitution minus 2 and the alkali metal hydroxide being present in amount less than 1 atom of alkali metal per diorgano substituted silicon atom, and in the presence of water in amount less than 1.5 times the amount of alkali metal hydroxide present by weight, which water is derived from sources extraneous to said alkali metal hydroxide and said siloxanes.

6. The method of preparing siloxanes, which comprises interacting a siloxane which contains diorgano substituted silicon and which has a degree of substitution of between 2 and 2.1, and a hexaorganodisiloxane, the organic radicals of said siloxanes being selected from the group consisting of alkyl and monocyclicaryl radicals, in intimate contact with an alkali metal hydroxide, the alkali metal hydroxide being present in amount less than 1 alkali metal atom per diorgano substituted silicon atom.

JAMES FRANKLIN HYDE.
WILLIAM HERBERT DAUDT.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,220 | Rochow | Oct. 7, 1941 |
| 2,258,222 | Rochow | Oct. 7, 1941 |
| 2,386,441 | Daudt | Oct. 9, 1945 |
| 2,398,187 | McGregor et al. | Apr. 9, 1946 |

FOREIGN PATENTS

| Number | Country | Date |
|---|---|---|
| 552,640 | Great Britain | Apr. 19, 1943 |

OTHER REFERENCES

Kipping et al., J. Chem. Soc. (London), 105 (1914), pp. 484-500.

Meads et al., J. Chem. Soc. (London), 105 (1914), pp. 679-690.

Hyde et al., J. Amer. Chem. Soc., 63 (1941), pp. 1194-1196.

Certificate of Correction

Patent No. 2,489,138                       November 22, 1949

JAMES FRANKLIN HYDE ET AL.

It is hereby certified that errors appear in the printed specification of the above numbered patent requiring correction as follows:

Column 2, line 2, for "totyl" read *tolyl*; line 4, for "an dalkenyl" read *and alkenyl*; line 5, for the words "an methallyl" read *and methallyl*; column 4, line 29, for "79.8)." read *79.8%).*; column 5, line 21, for "[i(CH$_3$)$_2$O]" read [$Si(CH_3)_2O$];

and that the said Letters Patent should be read with these corrections therein that the same may conform to the record of the case in the Patent Office.

Signed and sealed this 16th day of May, A. D. 1950.

[SEAL]

THOMAS F. MURPHY,
*Assistant Commissioner of Patents.*